(12) United States Patent
Kim

(10) Patent No.: US 12,204,764 B2
(45) Date of Patent: Jan. 21, 2025

(54) MEMORY SYSTEM INCLUDING MEMORY DIE DEDICATED FOR METADATA AND OPERATING METHOD THEREOF

(71) Applicant: SK hynix Inc., Icheon-si (KR)

(72) Inventor: Jung Woo Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/180,983

(22) Filed: Mar. 9, 2023

(65) Prior Publication Data

US 2024/0143192 A1 May 2, 2024

(30) Foreign Application Priority Data

Oct. 26, 2022 (KR) .......................... 10-2022-0139481

(51) Int. Cl.
*G06F 3/06* (2006.01)
(52) U.S. Cl.
CPC .......... *G06F 3/0619* (2013.01); *G06F 3/0647* (2013.01); *G06F 3/0683* (2013.01)
(58) Field of Classification Search
None
See application file for complete search history.

(56) References Cited

U.S. PATENT DOCUMENTS

| | | | |
|---|---|---|---|
| 10,949,110 B2* | 3/2021 | Secatch | G06F 3/0644 |
| 2014/0006688 A1* | 1/2014 | Yu | G06F 12/0246 365/185.03 |
| 2014/0115410 A1* | 4/2014 | Kealy | G06F 11/00 714/704 |
| 2015/0026449 A1* | 1/2015 | Heo | G06F 12/0246 713/2 |
| 2016/0077749 A1* | 3/2016 | Ravimohan | G06F 3/064 711/103 |
| 2020/0379903 A1* | 12/2020 | Perlmutter | G06F 12/0253 |
| 2021/0064249 A1* | 3/2021 | Mehta | G06F 11/1048 |
| 2021/0103388 A1* | 4/2021 | Choi | G06F 11/1471 |
| 2021/0165604 A1 | 6/2021 | Kim et al. | |
| 2023/0195356 A1* | 6/2023 | Luo | G06F 3/0604 711/154 |

FOREIGN PATENT DOCUMENTS

KR 10-2015-0111692 A 10/2015

* cited by examiner

*Primary Examiner* — Yaima Rigol

(57) ABSTRACT

A first memory device of a memory system is coupled to a memory controller through a first channel, and includes a first memory die set as a metadata memory die including a plurality of memory blocks to which metadata is to be written, and including one or more memory dies set as user data memory dies including a plurality of memory blocks to which user data is to be written. A memory controller of the memory system selects a second memory die among the memory dies set as the user data memory dies, migrates metadata written to the first memory die to the second memory die, migrates user data written to the second memory die to the first memory die, sets the first memory die as a user data memory die, and sets the second memory die as a metadata memory die.

15 Claims, 16 Drawing Sheets

MEMORY SYSTEM INCLUDING MEMORY DIE DEDICATED FOR METADATA AND OPERATING METHOD THEREOF

CROSS-REFERENCE TO RELATED APPLICATION

The present application claims priority under 35 U.S.C. § 119(a) to Korean Patent Application No. 10-2022-0139481 filed in the Korean Intellectual Property Office on Oct. 26, 2022, which is incorporated herein by reference in its entirety.

BACKGROUND

1. Technical Field

Various embodiments generally relate to a memory system and an operating method thereof.

2. Related Art

A memory system includes a storage device, which is a device that stores data based on a request of a host such as a computer, a mobile terminal (such as a smartphone or a tablet), or other various electronic devices. The memory system may include not only a device that stores data in a magnetic disk, such as a hard disk drive (HDD), but also a device that stores data in a nonvolatile memory, such as a solid state drive (SDD), a universal flash storage (UFS) device and an embedded MMC (eMMC) device.

The memory system may further include a memory controller for controlling a memory device (e.g., a volatile memory or a nonvolatile memory). The memory controller may receive a command from the host, and may perform or control an operation for reading, writing or erasing data with respect to the memory device included in the memory system, based on the received command. The memory controller may drive firmware for performing logical calculations to execute or control these operations.

Data stored in the memory device corresponds to content, and can be divided into user data accessible from the outside and metadata, which is data about data and is used for management of the data.

SUMMARY

Various embodiments are directed to a memory controller, a memory system and a method for operating a memory system, all capable of improving user data write/read performance through a memory die dedicated for metadata.

Also, various embodiments are directed to a memory controller, a memory system and a method for operating a memory system, all capable of constantly maintaining write/read performance.

In an embodiment, a memory system may include: a first memory device coupled to a first channel, and including a first memory die set as a metadata memory die including a plurality of memory blocks to which metadata is to be written, and including one or more memory dies set as user data memory dies including a plurality of memory blocks to which user data is to be written; and a memory controller configured to select a memory die whose run-time bad block count is greater than that of the first memory die from among the user data memory dies, as a second memory die; to migrate metadata written in the first memory die to the second memory die; to migrate user data written in the second memory die to the first memory die; to set the first memory die as a user data memory die; to and set the second memory die as a metadata memory die.

In an embodiment, a method for operating a memory system may include: selecting a memory die, from among a plurality of memory dies set as user data memory dies in which user data is stored, whose bad block count is greater than that of a first memory die to be set as a second memory die and a metadata memory die in which metadata is stored; migrating metadata written to the first memory die to the second memory die; migrating user data written to the second memory die to the first memory die; and setting the first memory die as a user data memory die, and setting the second memory die as a metadata memory die.

According to the embodiments of the disclosed technology, it is possible to improve user data write/read performance and constantly maintain write/read performance even though a certain memory die is degraded.

DETAILED DESCRIPTION

Hereinafter, embodiments of the present disclosure will be described in detail with reference to the accompanying drawings.

Figure 1:
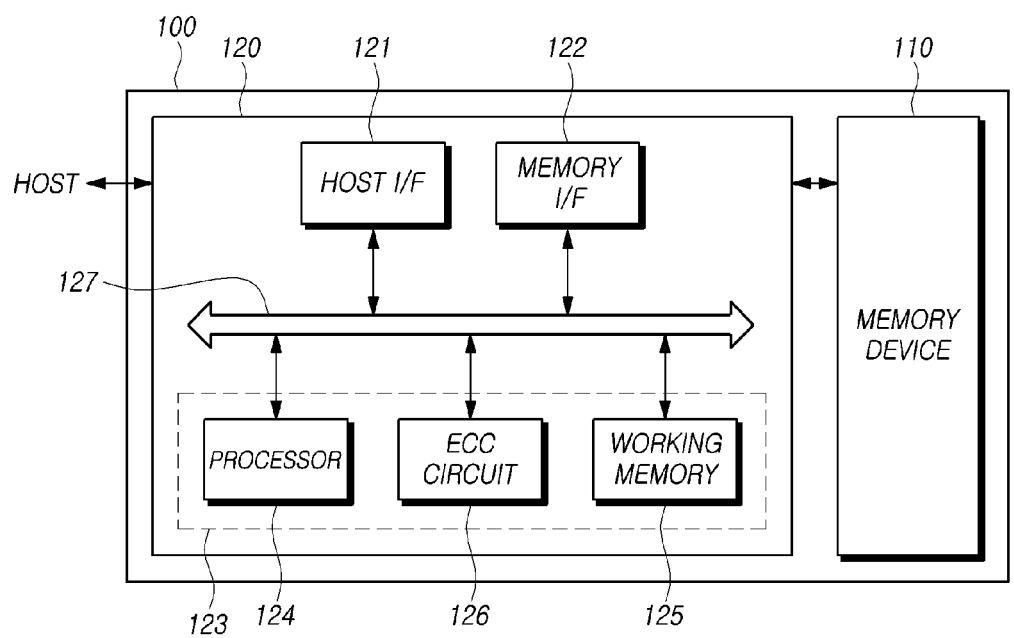
FIG. 1 is a schematic configuration diagram illustrating a memory system according to an embodiment of the disclosure.

FIG. 1 is a schematic configuration diagram illustrating a memory system according to an embodiment of the disclosure.

Referring to FIG. 1, a memory system 100 may include a memory device 110 that stores data and a memory controller 120 that controls the memory device 110.

The memory device 110 includes a plurality of memory blocks, and operates in response to the control of the memory controller 120. Operations of the memory device 110 may include, for example, a read operation, a program operation (also referred to as a write operation) and an erase operation.

The memory device 110 may include a memory cell array including a plurality of memory cells (also simply referred to as "cells"), which store data. Such a memory cell array may exist in a memory block.

For example, the memory device 110 may be implemented into various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (SU-RAM).

The memory device 110 may be implemented in a three-dimensional array structure. For example, embodiments of the disclosure may be applied to a charge trap flash (CTF) in which a charge storage layer is configured by a dielectric layer and a flash memory device in which a charge storage layer is configured by a conductive floating gate.

The memory device 110 is configured to receive a command, an address and so forth from the memory controller 120 and access an area in the memory cell array that is selected by the address. In other words, the memory device 110 may perform an operation corresponding to the command, on the area selected by the address.

The memory device 110 may perform a program operation, a read operation or an erase operation. For example, in the program operation, the memory device 110 may program data to an area selected by the address. In the read operation, the memory device 110 may read data from an area selected by the address. In the erase operation, the memory device 110 may erase data stored in an area selected by the address.

The memory controller 120 may control write (program), read, erase and background operations on the memory device 110. For example, background operations may include at least one from among a garbage collection (GC) operation, a wear leveling (WL) operation, a bad block management (BBM) operation, and so forth.

The memory controller 120 may control the operation of the memory device 110 according to a request of a host. The memory controller 120, however, may control the operation of the memory device 110 regardless or in the absence of a request of the host.

The memory controller 120 and the host may be devices that are separated from each other. The memory controller 120 and the host may be implemented by being integrated into one device. Hereunder, for the sake of convenience in explanation, descriptions include a memory controller 120 and a host that are devices separated from each other.

Referring to FIG. 1, the memory controller 120 may include a memory interface 122 and a control circuit 123, and may further include a host interface 121.

The host interface 121 provides an interface for communication with the host.

When receiving a command from the host, the control circuit 123 may receive the command through the host interface 121, and may perform an operation of processing the received command.

The memory interface 122 is coupled to the memory device 110 to provide an interface for communication with the memory device 110. That is to say, the memory interface 122 may be configured to provide the interface between the memory device 110 and the memory controller 120 in response to the control of the control circuit 123.

The control circuit 123 performs the general control operations of the memory controller 120 to control the operation of the memory device 110. To this end, for instance, the control circuit 123 may include at least one of a processor 124 and a working memory 125, and may further include an error detection and correction circuit (ECC circuit) 126.

The processor 124 may control the general operations of the memory controller 120, and may perform a logic calculation. The processor 124 may communicate with the host through the host interface 121, and may communicate with the memory device 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 is configured to randomize data received from the host. For example, the processor 124 may randomize data received from the host by using a randomizing seed. Randomized data, as data to be stored, is provided to the memory device 110 and is programmed to the memory cell array.

In a read operation, the processor 124 is configured to derandomize data received from the memory device 110. For example, the processor 124 may derandomize data received from the memory device 110 by using a derandomizing seed. Derandomized data may be outputted to the host.

The processor 124 may control the operation of the memory controller 120 by executing firmware. Namely, in order to control the general operation of the memory controller 120 and perform a logic calculation, the processor 124 may execute (drive) firmware loaded on the working memory 125, upon booting.

The firmware, as a program to be executed in the memory system 100, may include various functional layers.

For example, the firmware may include at least one from among a flash translation layer (FTL), which performs a translating function between a logical address requested to the memory system 100 from the host and a physical address of the memory device 110; a host interface layer (HIL), which serves to analyze a command requested to the memory system 100 as a storage device from the host and transfer the command to the flash translation layer (FTL); and a flash interface layer (FIL), which transfers a command, instructed from the flash translation layer (FTL), to the memory device 110.

For instance, such a firmware may be stored in the memory device 110 and then be loaded to the working memory 125.

The working memory 125 may store firmware, a program code, a command and data, which are necessary to drive the memory controller 120. Such a working memory 125 may be implemented as a volatile memory, such as for example at least one from among an SRAM (static RAM), a DRAM (dynamic RAM) and an SDRAM (synchronous DRAM).

The error detection and correction circuit 126 may be configured to detect an error bit of a checking target data, and to correct the detected error bit by using an error correction code. Here, the checking target data may be, for example, data stored in the working memory 125, data read from the memory device 110, or the like.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit for each read data, in the unit of sector when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 432 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect an uncorrectable sector. There may be one or more sectors that are determined to be uncorrectable. The error detection and correction circuit 126 may transfer information (for example, address information) regarding a sector which is determined to be uncorrectable to the processor 124.

A bus 127 may be configured to provide channels among the components 121, 122, 124, 125 and 126 of the memory controller 120. The bus 127 may include, for example, a control bus for transferring various control signals, commands and the like, a data bus for transferring various data, and so forth.

The above-described components 121, 122, 124, 125 and 126 of the memory controller 120 are for an illustration purpose only. Some of the above-described components 121, 122, 124, 125 and 126 of the memory controller 120 may be omitted, or some of the above-described components 121, 122, 124, 125 and 126 of the memory controller 120 may be integrated into one component. In addition to the above-described components 121, 122, 124, 125 and 126 of the memory controller 120, one or more other components may be added.

Hereinbelow, the memory device 110 will be described in further detail with reference to FIG. 2.

Figure 2:
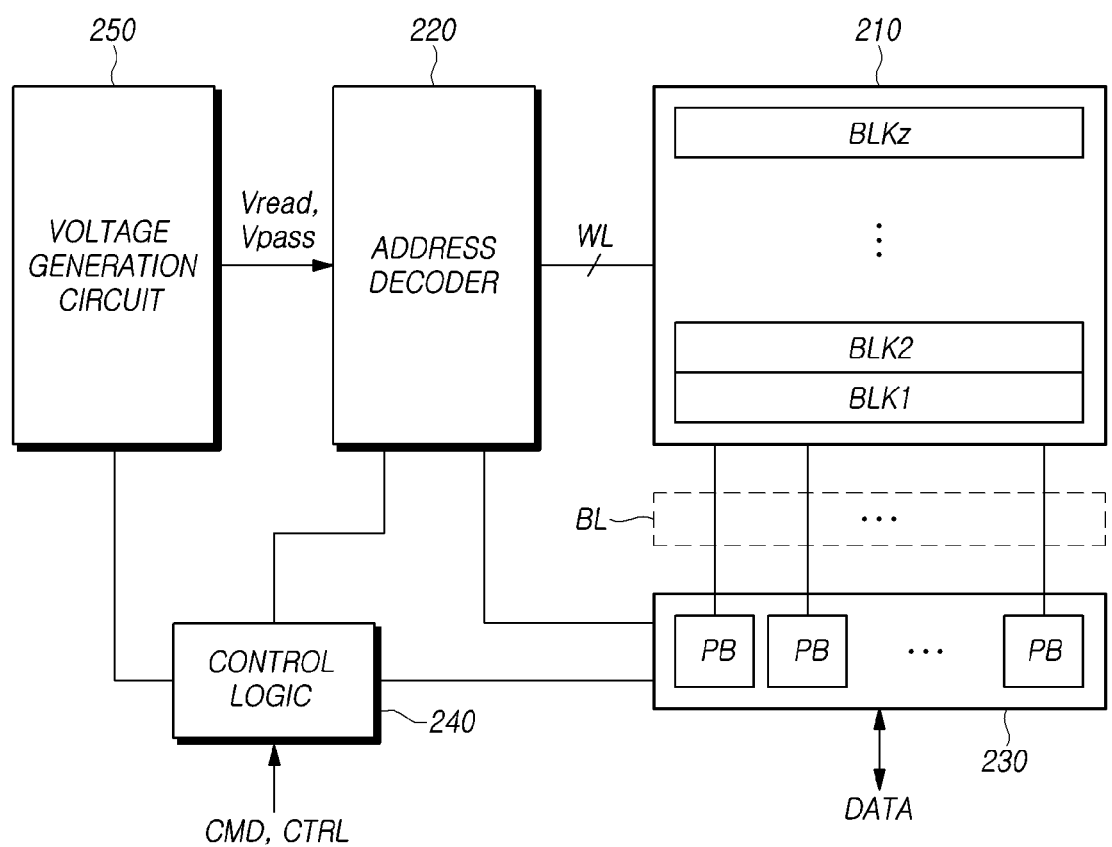
FIG. 2 is a block diagram schematically illustrating a memory device according to an embodiment of the disclosure.

FIG. 2 is a block diagram schematically illustrating a memory device according to an embodiment of the disclosure.

Referring to FIG. 2, a memory device 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

Referring to FIG. 2, the address decoder 220, the read and writhe circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory device 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory device 110 may be performed in the unit of page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory device 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory device 110.

The control logic 240 may be configured to control general operations of the memory device 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory device 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
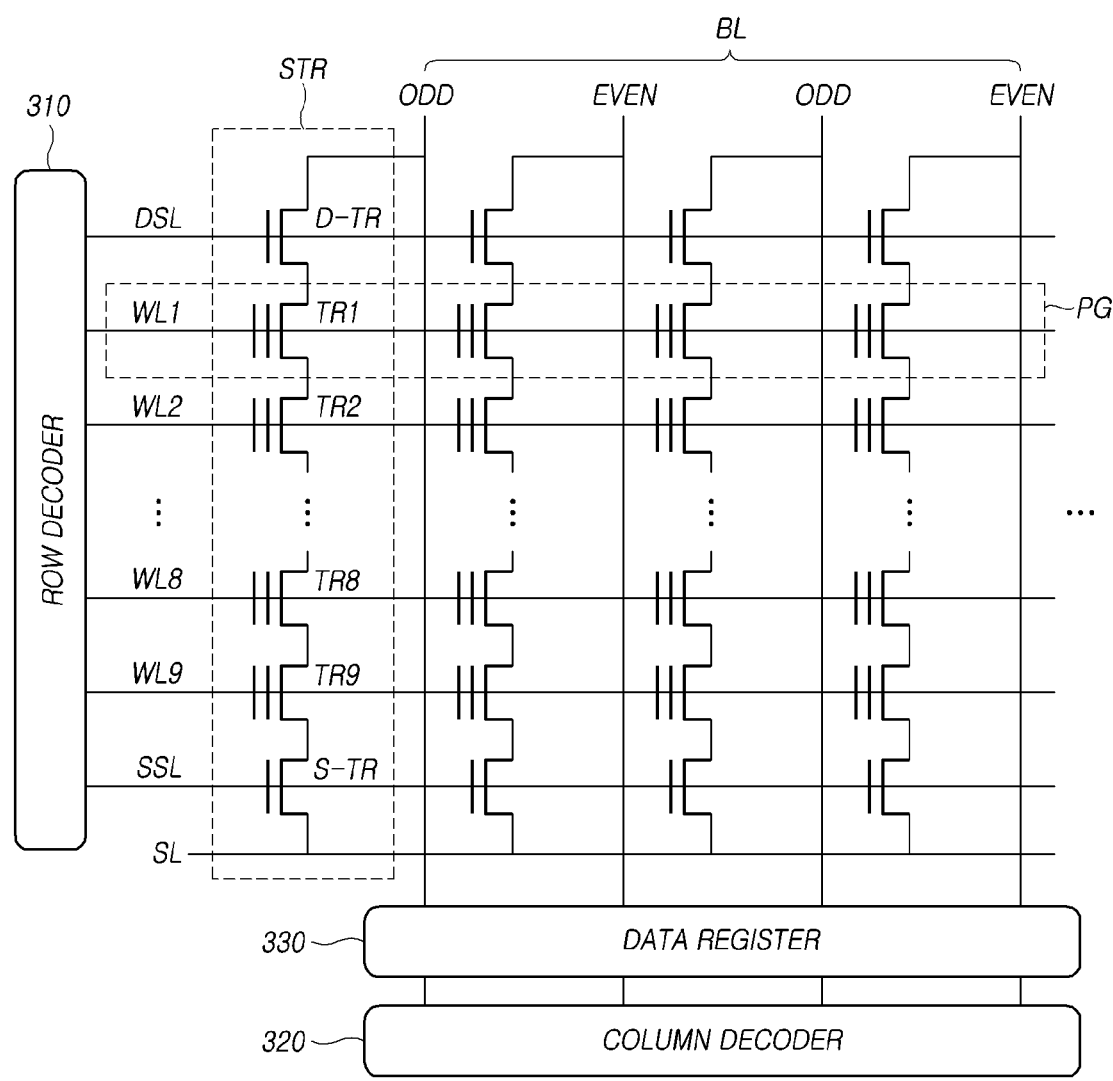
FIG. 3 is a diagram illustrating the structure of word lines and bit lines of a memory device based on an embodiment of the disclosed technology.

FIG. 3 is a diagram illustrating a structure of word lines WL and bit lines BL of a memory device according to an embodiment of the disclosure.

Referring to FIG. 3, in a memory device 110, memory cells MC are gathered in a core area. The memory device 110 has an auxiliary area, corresponding to the remaining area except the core area, that supports the operation of the memory cell array 210.

The core area may be configured by pages PG and strings STR. In the core area, a plurality of word lines WL1 to WL9 and a plurality of bit lines BL are disposed to intersect with each other.

The plurality of word lines WL1 to WL9 may be coupled with a row decoder 310, and the plurality of bit lines BL may be coupled with a column decoder 320. A data register 330 corresponding to a read and write circuit 230 of FIG. 2 may be arranged between the plurality of bit lines BL and the column decoder 320.

The plurality of word lines WL1 to WL9 correspond to a plurality of pages PG.

For example, as illustrated in FIG. 3, each of the plurality of word lines WL1 to WL9 may correspond to a page PG. If the size of each of the plurality of word lines WL1 to WL9 is large, however, then each of the plurality of word lines WL1 to WL9 may correspond to at least two or more (for example, four) pages PG. A page PG is a minimum unit in performing a program operation and a read operation. In program operations and read operations, all memory cells MC in the same page PG may simultaneously perform the corresponding operations.

The plurality of bit lines BL may be coupled with the column decoder 320 while being divided into odd-numbered bit lines BL and even-numbered bit lines BL.

In order to access memory cells MC, an address may be entered into the core area through the row decoder 310 and the column decoder 320 via an input/output terminal to designate target memory cells. Designating target memory cells means accessing memory cells MC located at sites where the selected word lines WL1 to WL9 coupled with the row decoder 310 and the bit lines BL coupled with the column decoder 320 intersect with each other, to program data to the memory cells MC or read out programmed data from the memory cells MC.

Since data is programmed and read via the data register 330 in all data processing operations of the memory device 110, the data register 330 plays a key role. If data processing of the data register 330 is delayed, then all the other areas need to wait until the data register 330 completes the data processing. Also, if the performance of the data register 330 is degraded, then the overall performance of the memory device 110 may be degraded.

Referring FIG. 3, in one string STR, a plurality of transistors TR1 to TR9 are coupled with the plurality of word lines WL1 to WL9, respectively. Areas with the plurality of transistors TR1 to TRn correspond to a plurality of memory cells MC. The plurality of transistors TR1 to TR9 are transistors, each of which includes a control gate CG and a floating gate FG.

The plurality of word lines WL1 to WL9 include two outermost word lines WL1 and WL9. A first select line DSL may be additionally disposed outside a first outermost word line WL1, which is more adjacent to the data register 330 in terms of signal path between the two outermost word lines WL1 and WL9, and a second select line SSL may be additionally disposed outside a second outermost word line WL9 between the two outermost word lines WL1 and WL9.

A first select transistor D-TR, which is on-off controlled by the first select line DSL, is a transistor that has only a gate electrode coupled with the first select line DSL and does not include a floating gate FG. A second select transistor S-TR, which is on-off controlled by the second select line SSL, is a transistor that has only a gate electrode coupled with the second select line SSL and does not include a floating gate FG.

The first select transistor D-TR serves as a switch that turns on or off the coupling between a corresponding string STR and the data register 330. The second select transistor S-TR serves as a switch that turns on or off the coupling between the corresponding string STR and a source line SL. That is to say, the first select transistor D-TR and the second select transistor S-TR are positioned at both ends of the corresponding string STR, and serve as gatekeepers that couple and decouple signals.

In a program operation, because it is necessary to fill electrons in a target memory cell MC of a bit line BL that is to be programmed, the memory system 100 turns on the first select transistor D-TR by applying a predetermined turn-on voltage Vcc to the gate electrode of the first select transistor D-TR, and turns off the second select transistor S-TR by applying a predetermined turn-off voltage (e.g., 0V) to the gate electrode of the second select transistor S-TR.

In a read operation or a verify operation, the memory system 100 turns on both the first select transistor D-TR and the second select transistor S-TR. Accordingly, current may be discharged to the source line SL corresponding to the ground through the corresponding string STR so that a voltage level of the bit line BL may be measured. However, in the read operation, there may be a time difference between on-off timings of the first select transistor D-TR and the second select transistor S-TR.

In an erase operation, the memory system 100 may supply a predetermined voltage (e.g., +20V) to a substrate through the source line SL. In the erase operation, the memory system 100 floats both the first select transistor D-TR and the second select transistor S-TR, thereby providing infinite resistance. Accordingly, the memory system 100 is structured such that the first select transistor D-TR and the second select transistor S-TR do not function and electrons may operate due to a potential difference only between a floating gate FG and the substrate.

Figure 4:
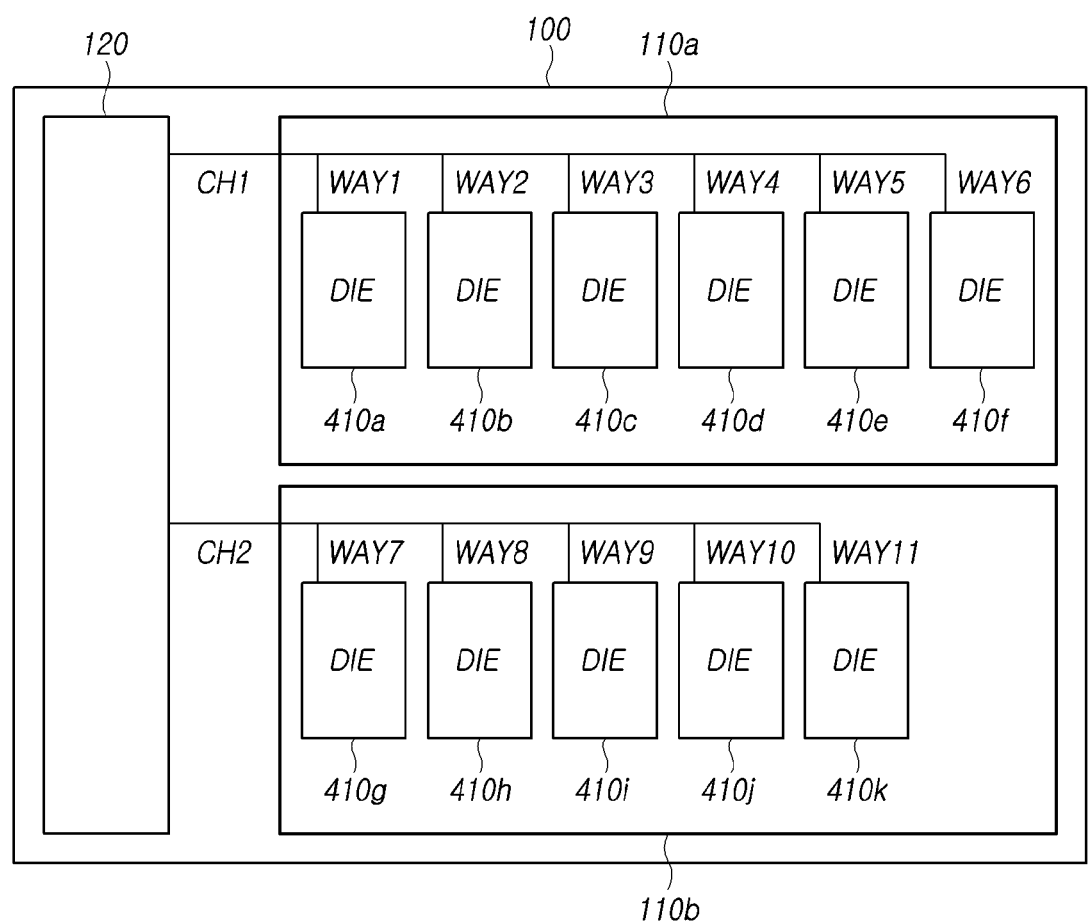
FIG. 4 is a diagram illustrating channels coupling a memory controller and memory devices according to an embodiment of the disclosure.

FIG. 4 is a diagram illustrating channels coupling a memory controller and memory devices according to an embodiment of the disclosure.

Referring to FIG. 4, a first memory device 110a may be coupled to a memory controller 120 through a first channel CH1, and may communicate with the memory controller 120 through the first channel CH1. A second memory device 110b may be coupled to the memory controller 120 through a second channel CH2. Each of the memory devices 110a and 110b may include a plurality of memory dies DIE, and each memory die DIE may include a plurality of memory blocks.

A memory system 100 has a multi-channel structure. The memory controller 120 may simultaneously access the memory devices 110a and 110b respectively through the channels CH1 and CH2, so that the operating speed of the memory system 100 may be improved. In the first channel CH1, a plurality of memory dies 410a, 410b, ..., 410f included in the first memory device 110a are accessed through a plurality of ways WAY1, WAY2, ..., WAY6, respectively. In the second channel CH2, a plurality of memory dies 410g, 410h, ..., 410k included in the second memory device 110b are accessed through a plurality of ways WAY7, WAY8, ..., WAY11, respectively. The memory controller 120 may perform an interleaving operation using a plurality of memory dies coupled to one channel, and the multi-way structure may improve the operating speed of the memory system 100.

The memory controller 120 may distribute a workload to respective channels by performing a write operation alternately in the respective channels, which may efficiently use the plurality of channels CH1 and CH2.

The memory system 100 may have an asymmetrical channel-way structure in which the number of memory dies 410a, 410b, ..., 410f included in the first memory device 110a and the number of memory dies 410g, 410h, ..., 410k included in the second memory device 110b are different from each other. In other embodiments, a memory system may have a symmetrical channel-way structure in which the number of memory dies included in a first memory device and the number of memory dies included in a second memory device are the same as each other.

Blocks included in the memory die DIE may be classified into free blocks, open blocks and closed blocks. A free block is a memory block on which an erase operation is performed by the memory controller 120, and all pages included in the free memory block are erased. An open block is a block in which data is written to only some pages included in a memory block, and new data can be written to the open memory block. A closed block is a block in which data is written to all pages included in a memory block, so new data cannot be written to the closed memory block. In order to write new data to the closed block, the closed block should be converted into a free block through an erase operation.

The multi-channel and multi-way structure illustrated in FIG. 4 are exemplary. The structure may further include an additional channel in addition to the first channel CH1 and the second channel CH2. The memory devices 110a and 110b may include fewer ways or more ways than illustrated in FIG. 4. Although FIG. 4 illustrates that one memory die DIE is coupled to one way, a plurality of dies DIE may be coupled to one way, or a plurality of ways may be coupled to one memory die DIE.

Figure 5:
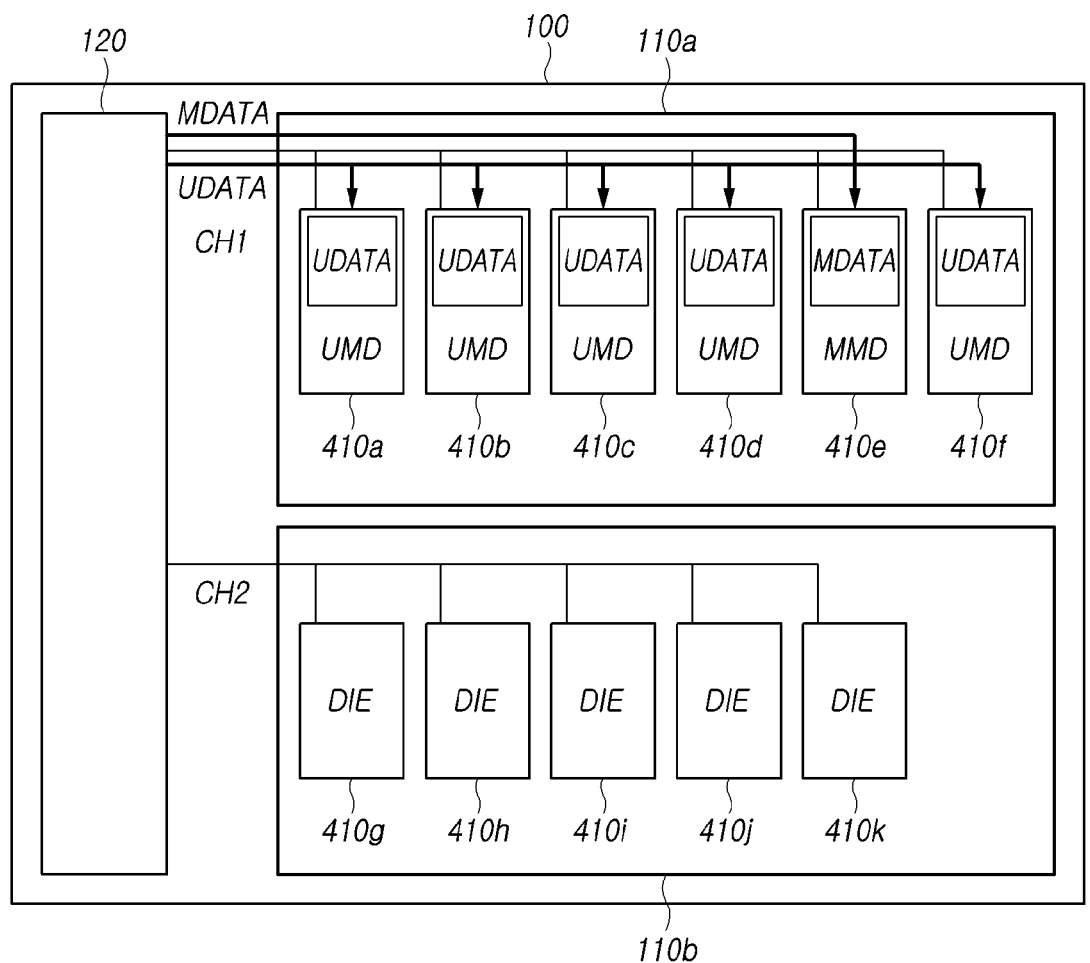
FIG. 5 is a diagram illustrating a metadata memory die and user data memory dies according to an embodiment of the disclosure.

FIG. 5 is a diagram illustrating a metadata memory die and user data memory dies according to an embodiment of the disclosure.

Referring to FIG. 5, a first memory device 110a may include a memory die set as a metadata memory die MMD to which metadata MDATA is written, and one or more memory dies set as user data memory dies UMD, to which user data UDATA is written.

In FIG. 5, among the memory dies DIE included in the first memory device 110a, the memory die 410e is set as the metadata memory die MMD and the remaining memory dies 410a, 410b, 410c, 410d and 410f are set as user data memory dies UMD.

When writing user data UDATA to the first memory device 110a, the memory controller 120 may write the user data UDATA to the memory dies 410a, 410b, 410c, 410d and 410f set as the user data memory dies UMD. The memory controller 120 may write metadata MDATA to the memory die 410e set as the metadata memory die MMD.

The metadata memory die MMD, as a memory die dedicated to metadata MDATA, is a memory die DIE to which all metadata MDATA necessary for the operation of the memory system 100 are written. The user data memory die UMD is a memory die DIE to which user data UDATA can be written. The memory controller 120 may set any one from among the plurality of memory dies DIE included in the first memory device 110a as the metadata memory die MMD, and may set the remaining memory dies DIE as the user data memory dies UMD.

The memory controller 120 may assign, to the plurality of memory dies DIE, a first state in which only metadata MDATA can be written or a second state in which user data UDATA can be written. The memory die DIE of the first state may store only metadata MDATA, and only metadata MDATA may be written to the memory die DIE of the first state. The second state corresponds to a state other than the first state. The memory die DIE of the second state is a memory die DIE that can store user data UDATA or to which user data UDATA can be written. By assigning the first state to the memory die 410e, the memory controller 120 may write only metadata MDATA to the memory die 410e, and the memory die 410e may store only metadata MDATA. By assigning the second state to the remaining memory dies 410a, 410b, 410c, 410d and 410f, the memory controller 120 may write user data UDATA to the remaining memory dies 410a, 410b, 410c, 410d and 410f, and the remaining memory dies 410a, 410b, 410c, 410d and 410f may store user data UDATA.

In order to ensure the reliability of the memory system 100, each of the memory blocks included in the memory die DIE can have only a limited number of erase operations. Therefore, if the count of erase operations on a memory block exceeds a predetermined count or the memory block has a physical defect, the memory block may not normally operate. A bad block means a memory block that does not operate normally, and the memory controller 120 separately manages bad blocks in order to ensure reliability of the memory system 100.

The memory controller 120 may improve operating performance of the memory system 100 through interleaving during an operation of simultaneously processing a request, received from the outside, through the memory dies DIE set as the plurality of user data memory dies UMD.

A memory die DIE having a large number of bad blocks limits the interleaving operation of the memory controller 120 when writing/reading user data, thereby preventing the memory system 100 from exhibiting maximum performance.

When setting the metadata memory die MMD for the first time, the memory controller 120 may set a memory die DIE with a greatest initial bad block count from among the plurality of memory dies DIE included in the first memory device 110a, as the metadata memory die MMD.

Figure 6:
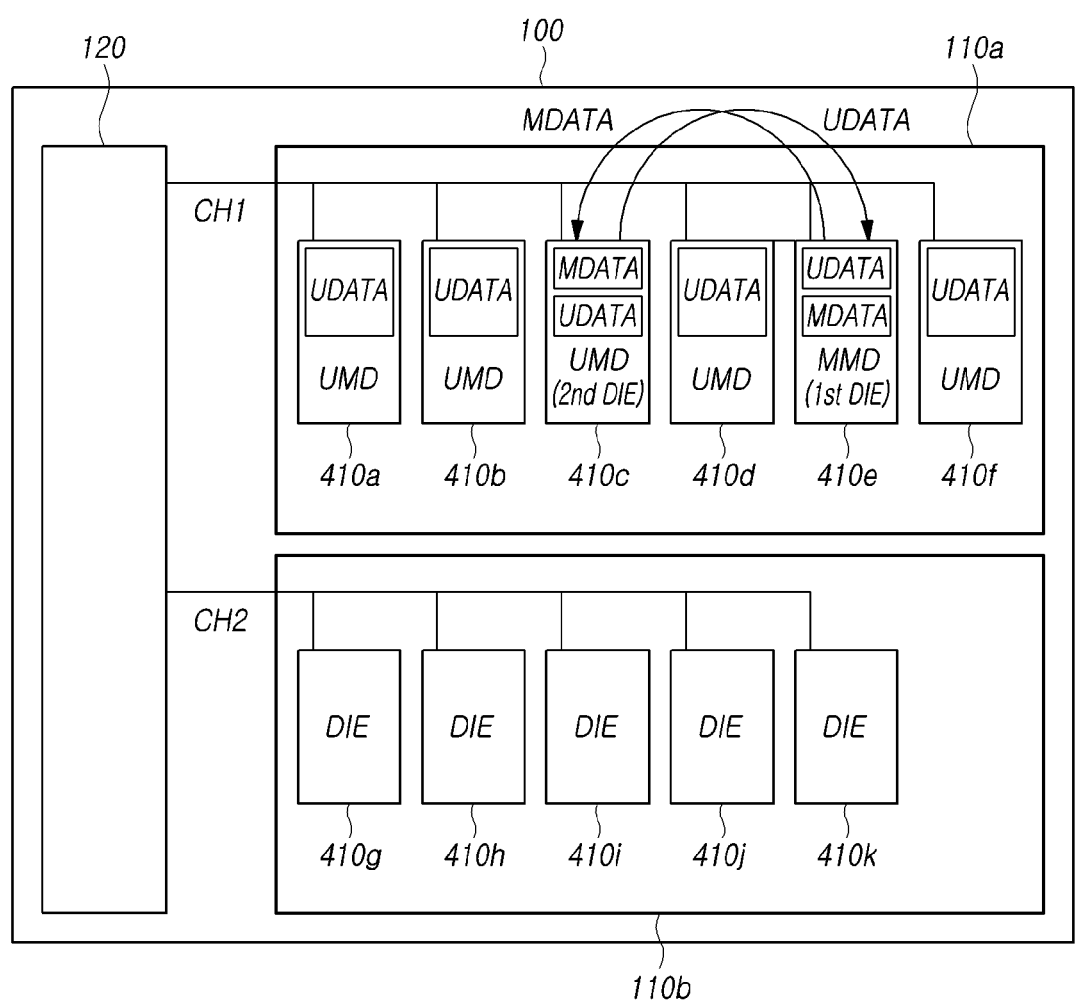
FIG. 6 is a diagram illustrating migration of metadata and user data according to an embodiment of the disclosure.

FIG. 6 is a diagram illustrating migration of metadata and user data according to an embodiment of the disclosure.

Referring to FIG. 6, a second memory die 2nd DIE may be determined from among the memory dies DIE set as the user data memory dies UMD. Metadata MDATA written to a first memory die 1st DIE may be migrated to the second memory die 2nd DIE, and user data UDATA written to the second memory die 2nd DIE may be migrated to the first memory die 1st DIE.

The plurality of memory dies DIE may undergo degradation such as changes in the characteristics of memory cells according to read, write and erase operations of the memory system 100. For example, a memory die DIE whose performance has decreased to a level below that of the first memory die 1st DIE that was set as the metadata memory die MMD may be found among the memory dies DIE that are user data memory dies UMD. The memory controller 120 may determine that the memory die DIE with the decrease in performance to a level below that of the first memory die 1st DIE is the second memory die 2nd DIE. Then, the memory controller 120 may swap the first memory die 1st DIE and the second memory die 2nd DIE with each other. That is to say, the memory controller 120 may set the first memory die 1st DIE as a user data memory die UMD to which user data UDATA is written, and may set the second memory die 2nd DIE as a metadata memory die MMD to which metadata MDATA is written. Before swapping the first memory die 1st DIE and the second memory die 2nd DIE, the memory controller 120 may migrate the metadata MDATA stored in the first memory die 1st DIE to the second memory die 2nd DIE, and may migrate the user data UDATA stored in the second memory die 2nd DIE to the first memory die 1st DIE.

Before migrating the user data UDATA stored in the second memory die 2nd DIE to the first memory die 1st DIE, the memory controller 120 may change the first memory die 1st DIE, to which the first state is assigned, to the second state. After the state of the first memory die 1st DIE is changed to the second state, the memory controller 120 may write the user data UDATA to the first memory die 1st DIE.

In FIG. 6, if the degraded performance of a memory die DIE occurs in the memory die 410c, and the performance of the memory die 410c falls to a level lower than that of the memory die 410e, which is the first memory die 1st DIE, then the memory controller 120 may determine the memory die 410c as the second memory die 2nd DIE based on the bad block count of the memory dies. The memory controller 120 may migrate the metadata MDATA stored in the memory die 410e to the memory die 410c. Also, the memory controller 120 may migrate the user data UDATA stored in the second memory die 2nd DIE to the memory die 410e.

When migrating the metadata MDATA, the memory controller 120 may divide the metadata MDATA into units of a predetermined size such as one-shot program units or full-interleaving units, and thereby, may migrate the metadata MDATA periodically over a plurality of different time periods. Alternatively, the memory controller 120 may migrate all the metadata MDATA at once.

The memory controller 120 may simultaneously perform migration of the metadata MDATA and migration of the user data UDATA. In other words, in a state in which only a part of the metadata MDATA written to the memory die 410e is migrated to the memory die 410c, a part of the user data UDATA written to the memory die 410c may be migrated to the memory die 410e.

The data migration is complete when only metadata MDATA exists without valid user data UDATA in the memory die 410c, and only user data UDATA exists without valid metadata MDATA in the memory die 410e. Thereafter, the memory controller 120 may operate the memory die 410c as a metadata memory die MMD and the memory die 410e as a user data memory die UMD. The memory controller 120 may assign the first state to the memory die 410c.

Figure 7:
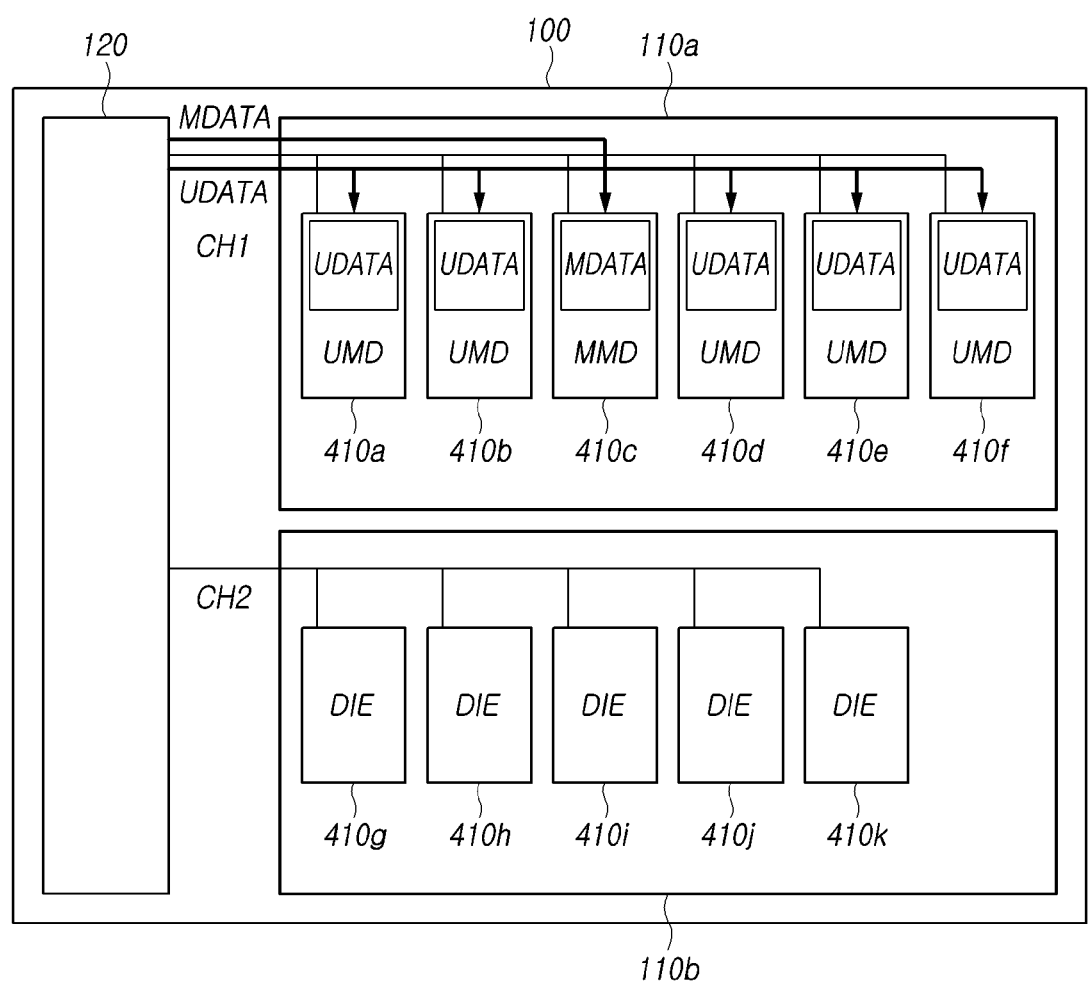
FIG. 7 is a diagram illustrating a memory system after migration of metadata and user data is finished according to an embodiment of the disclosure.

FIG. 7 is a diagram illustrating a memory system after migration of metadata and user data is finished according to an embodiment of the disclosure.

Referring to FIGS. 6 and 7, the memory controller 120 may set the first memory die 1st DIE as a user data memory die UMD, and may set the second memory die 2nd DIE as a metadata memory die MMD.

According to the description made above with reference to FIG. 6, the metadata MDATA stored in the memory die 410e corresponding to the first memory die 1st DIE is migrated to the memory die 410c corresponding to the second memory die 2nd DIE, and the user data UDATA stored in the memory die 410c is migrated to the memory die 410e. After the migration of the metadata MDATA and the user data UDATA is ended, the memory controller 120 may set the memory die 410c as a metadata memory die MMD, and may set the memory die 410e as a user data memory die UMD. Thereafter, the memory controller 120 may write metadata MDATA to the memory die 410c, and may store user data UDATA to the remaining memory dies 410a, 410b, 410d, 410e and 410f, which includes the memory die 410e.

As described above, after the migration of the metadata MDATA and the user data UDATA is completed, the memory controller 120 may assign the first state to the memory die 410c. Because the memory controller 120 can no longer write user data UDATA to the memory die 410c of the first state, and the memory controller 120 may only write metadata MDATA to the memory die 410c.

In this manner, the memory controller 120 may store metadata MDATA in the memory die 410c, whose performance is relatively degraded, and may store user data UDATA in the remaining memory dies 410a, 410b, 410d, 410e and 410f with relatively high performance, thereby improving read/write access performance to the user data UDATA.

Figure 8:
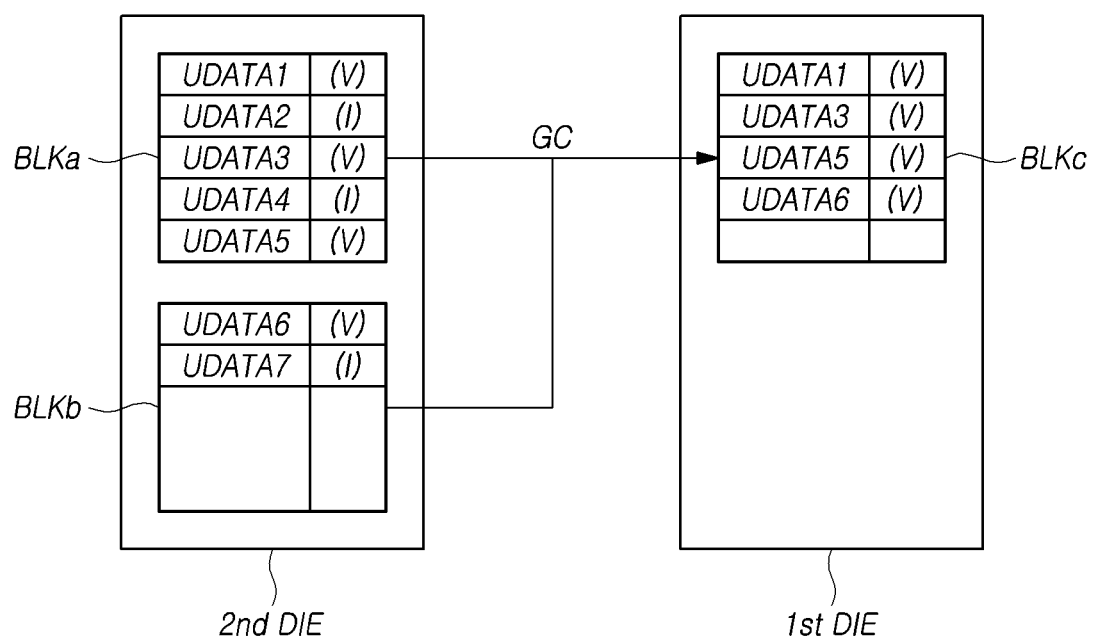
FIG. 8 is a diagram illustrating an example of a garbage collection operation according to an embodiment of the disclosure.

FIG. 8 is a diagram illustrating an example of a garbage collection operation.

Referring to FIG. 8, when migrating user data UDATA written to a second memory die 2nd DIE to a first memory die 1st DIE, a memory controller 120 may use a garbage collection operation. When performing garbage collection on the second memory die 2nd DIE, the memory controller 120 may set one of a plurality of memory blocks included in the first memory die 1st DIE as a destination memory block to which valid data is to be written.

As one of background operations, the memory controller 120 may perform a garbage collection operation of writing only valid data, from the data written to a memory block, to a destination memory block and then performing an erase operation on the memory block, thereby securing a storage space.

In FIG. 8, user data are written to each of a memory block BLKa and a memory block BLKb included in the second memory die 2nd DIE. User data UDATA1, UDATA3, UDATA5 and UDATA6 correspond to valid data, and user data UDATA2, UDATA4 and UDATA7 correspond to invalid data.

The memory controller 120 may set a memory block BLKc included in the first memory die 1st DIE, as a destination memory block. The memory controller 120 may write only valid data from the memory block BLKa and the memory block BLKb to the memory block BLKc. Thereafter, the memory controller 120 may perform an erase operation on the memory block BLKa and the memory block BLKb to convert them into free blocks, which are blocks in which all data are erased.

The destination memory block BLKc for garbage collection may be a free block or an open block among memory blocks included in the first memory die 1st DIE.

Figure 9:
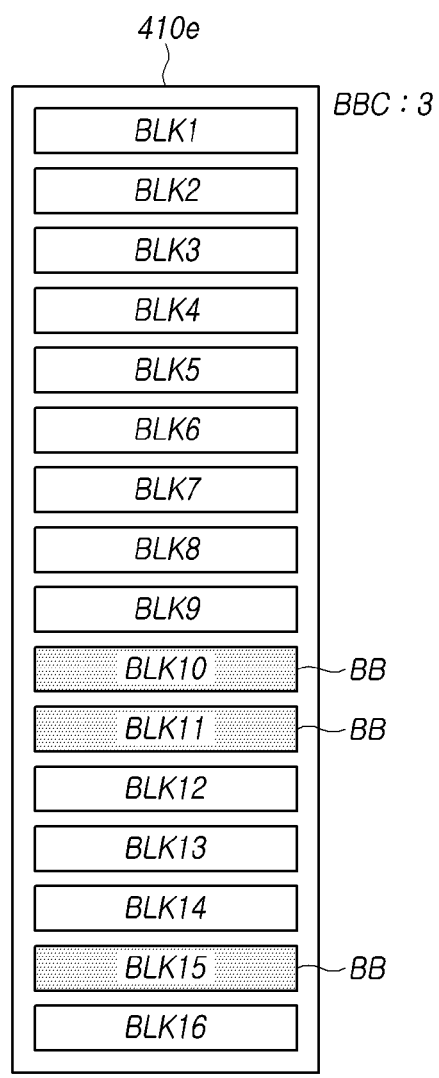
FIG. 9 is a diagram illustrating bad blocks of a metadata memory die according to an embodiment of the disclosure.

FIG. 9 is a diagram illustrating bad blocks of a metadata memory die according to an embodiment of the disclosure.

Figure 10:
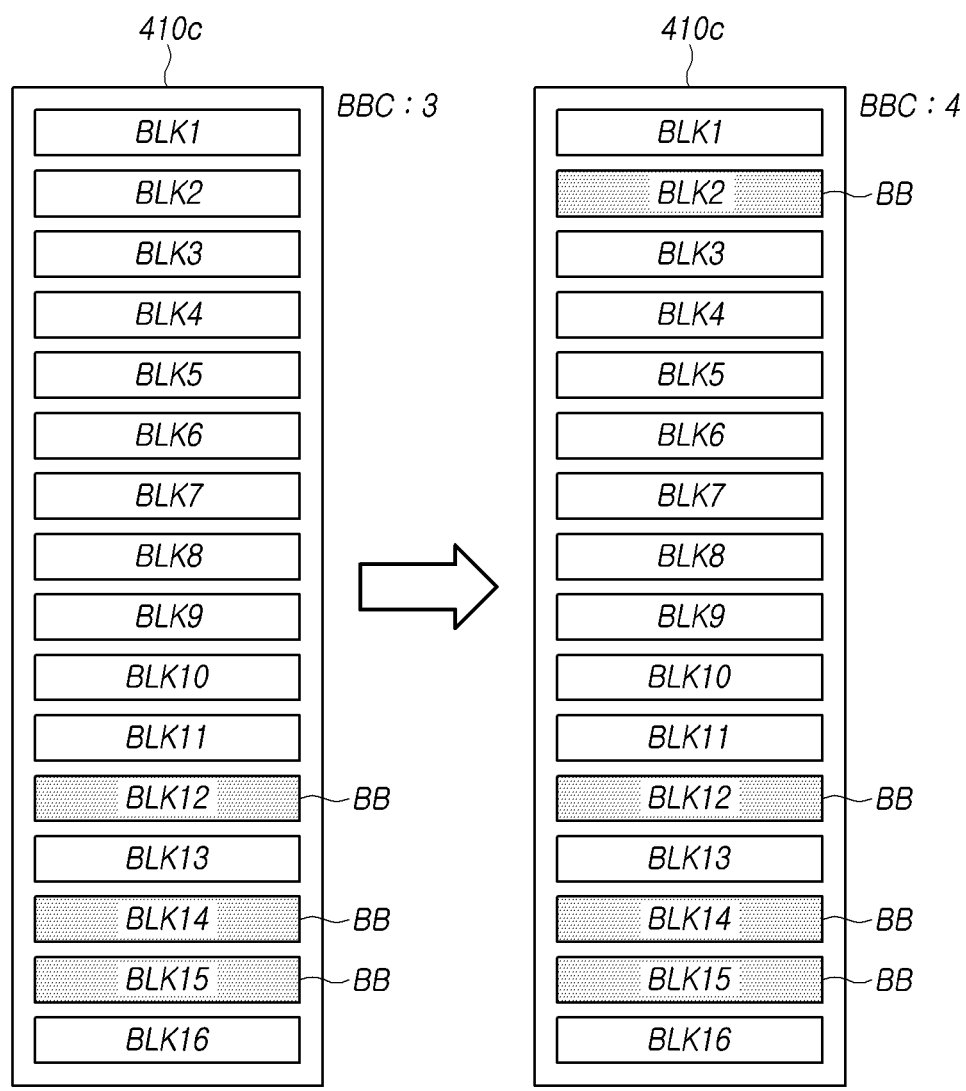
FIG. 10 is a diagram illustrating bad blocks of a user data memory die according to an embodiment of the disclosure.

FIG. 10 is a diagram illustrating bad blocks of a user data memory die according to an embodiment of the disclosure.

Referring to FIGS. 5, 9 and 10, the memory controller 120 may determine that a memory die is the second memory die 2nd DIE when the memory die has a bad block count BBC greater than that of the first memory die 1st DIE, on the basis of occurrence of run-time bad blocks from among the memory dies DIE set as the user data memory dies UMD.

The memory die DIE set as the metadata memory die MMD for the first time may be a memory die DIE whose initial bad block count BBC is highest. The bad block counts BBC of the memory dies DIE set as the user data memory dies UMD are equal to or smaller than the bad block count BBC of the memory die DIE set as the metadata memory die MMD. During the operation of the memory system 100, a run-time bad block may occur in a memory die DIE set as the user data memory die UMD. The bad block count BBC of the memory die DIE may increase due to the run-time bad block that occurred in the operation of the memory system 100.

The memory die 410e of FIG. 9, as the first memory die 1st DIE illustrated in FIG. 5, corresponds to the memory die DIE set as the metadata memory die MMD. Since bad blocks BB of the memory die 410e are memory blocks BLK10, BLK11 and BLK15, the bad block count BBC of the memory die 410e is three.

The memory die 410c of FIG. 10, as the second memory die 2nd DIE illustrated in FIG. 5, corresponds to the user data memory die UMD in which user data UDATA is stored. The memory die 410c may be a memory die DIE whose bad block count BBC is greatest from among the remaining memory dies DIE except the memory die 410e. Since bad blocks BB of the memory die 410c are memory blocks BLK12, BLK14 and BLK15, the bad block count BBC of the memory die 410c is three. As degradation of a memory block BLK2 of the memory die 410c progresses due to the operation of the memory system 100, the memory block BLK2 may be determined as a bad block BB. The bad block count BBC of the memory die 410c increases from three to four. Since the bad block count BBC of the memory die 410c is now greater than the bad block count BBC of the memory die 410e, the memory controller 120 may determine that the memory die 410c is the second memory die 2nd DIE.

Thereafter, the memory controller 120 may migrate the metadata MDATA stored in the memory die 410e to the memory die 410c, and may migrate the user data UDATA stored in the memory die 410c to the memory die 410e.

Figure 11:
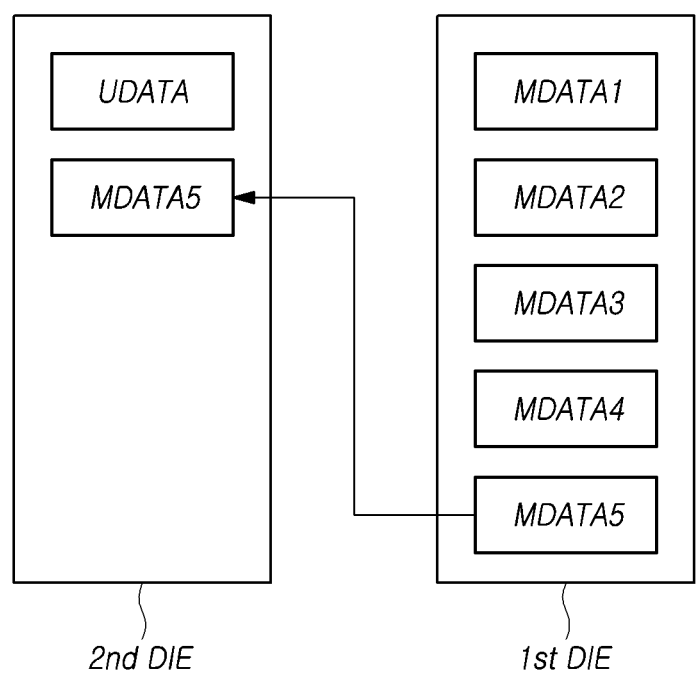
FIG. 11 is a diagram illustrating migration of metadata according to an embodiment of the disclosure.

FIG. 11 is a diagram illustrating migration of metadata according to an embodiment of the disclosure.

Referring to FIG. 11, when migrating metadata MDATA written to the first memory die 1st DIE to the second memory die 2nd DIE, the memory controller 120 may preferentially migrate metadata MDATA that was most recently written.

In FIG. 11, metadata MDATA1 to metadata MDATA5 are written in chronological order. The metadata MDATA1 is the earliest written metadata MDATA, and the metadata MDATA5 is metadata MDATA that was most recently written.

The memory controller 120 may preferentially write the metadata MDATA5, which is most recently written to the first memory die 1st DIE, to the second memory die 2nd DIE. After the migration of the metadata MDATA5 is ended, the memory controller 120 may migrate the metadata MDATA4 corresponding to a next turn to the second memory die 2nd DIE.

Due to the nature of metadata MDATA, the metadata MDATA5 that was most recently written is less likely to be updated than the metadata MDATA1, which is written earliest. As a result, the memory controller 120 may perform migration of the metadata MDATA from the first memory die 1st DIE to the second memory die 2nd DIE in chronological order according to the time that a metadata MDATA was written to the first memory die 1st DIE. This way, it is possible to prevent a repetitive update likely to occur to the most recently written metadata after the metadata migration.

When migrating the metadata MDATA, the memory controller 120 may migrate the metadata MDATA by units of memory blocks.

For example, the memory controller 120 may write only valid data in a memory block in which the metadata MDATA5 is located, which is the second memory die 2nd DIE. Thereafter, the memory controller 120 may select a memory block in which the most recently written metadata MDATA4 is located, from among remaining memory blocks except for the migrated memory block (MDATA5) of the first memory die 1st DIE. The memory controller 120 may write only valid data in the memory block in which the metadata MDATA4 is located, which is the second memory die 2nd DIE.

In another example, when migrating the metadata MDATA, the memory controller 120 may migrate the metadata MDATA by preferentially considering metadata MDATA of closed blocks. The memory controller 120 may migrate valid data of a closed memory block in which the most recently written metadata MDATA5 is located from among all closed blocks (meaning a memory block which is most recently converted from an open block into a closed block) in the first memory die 1st DIE. The closed memory block with the most recently written metadata MDATA5 is migrated to the second memory die 2nd DIE. Thereafter, the memory controller 120 may migrate valid data of a closed memory block in which the metadata MDATA4, which was written immediately before the metadata MDATA5, is located from among remaining closed blocks (meaning a memory block which is converted from an open block into a closed block before the memory block to which the metadata MDATA5 is written is converted into a closed block), to the second memory die 2nd DIE. After migrating metadata MDATA written to closed blocks, the memory controller 120 may perform an erase operation on the corresponding closed blocks to convert the corresponding closed blocks into free blocks.

In order to write the aforementioned metadata MDATA to the second memory die 2nd DIE, the memory controller 120 may manage, through a list, a sequence in which the metadata MDATA are written, a sequence in which memory blocks are opened, and a sequence in which memory blocks are closed.

Figure 12:
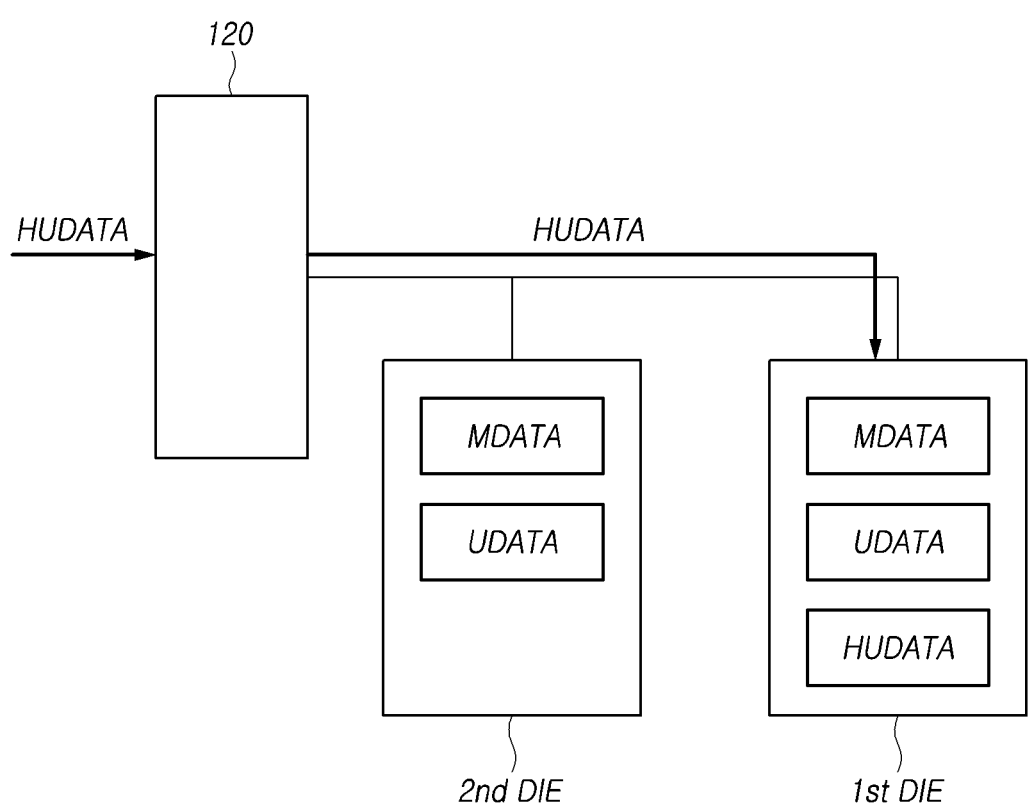
FIG. 12 is a diagram illustrating an example of writing user data by a memory controller according to an embodiment of the disclosure.

FIG. 12 is a diagram illustrating an example of writing user data by a memory controller according to an embodiment of the disclosure.

Referring to FIG. 12, after migration of the metadata MDATA written to the first memory die 1st DIE is started, the memory controller 120 may receive, from the outside, a request to write host user data HUDATA. According to the request to write the host user data HUDATA, the memory controller 120 may write the host user data HUDATA to the first memory die 1st DIE.

The host user data HUDATA is not the user data UDATA previously written to the first memory device 110a, but instead user data UDATA to be written to the first memory device 110a from the outside (including a host) of the memory system 100 after the migration of the metadata MDATA written to the first memory die 1st DIE is started. When receiving the request to write the host user data HUDATA from the outside, the memory controller 120 may write the host user data HUDATA not to the second memory die 2nd DIE set, as the user data memory die UMD, but to the first memory die 1st DIE of the second state.

If the host user data HUDATA is written to the second memory die 2nd DIE when migrating user data UDATA to the first memory die 1st DIE, then the corresponding host user data HUDATA would need to be migrated again. This is avoided by writing the host user data HUDATA to not the second memory die 2nd DIE but to the first memory die 1st DIE. The memory controller 120 may omit a process of migrating the host user data HUDATA from the second memory die 2nd DIE to the first memory die 1st DIE.

Figure 13:
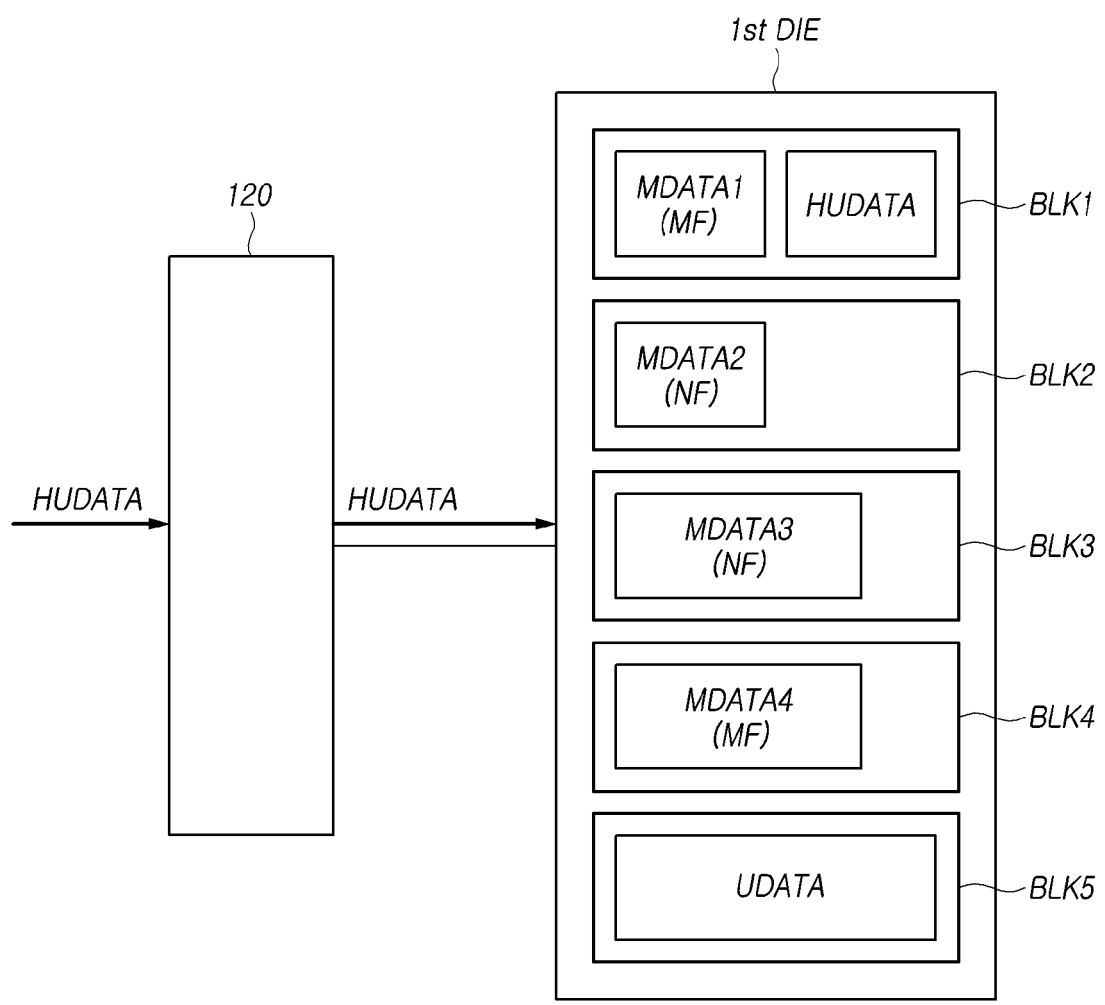
FIG. 13 is a diagram illustrating an example of a memory block to which user data is written according to an embodiment of the disclosure.

FIG. 13 is a diagram illustrating an example of a memory block to which user data is written according to an embodiment of the disclosure.

Referring to FIG. 13, a host user data HUDATA may be written to a memory block from which migration of metadata MDATA from the first memory die 1st DIE is finished (MF).

In FIG. 13, each of metadata MDATA1, MDATA2, MDATA3 and MDATA4 written to open memory blocks BLK1, BLK2, BLK3 and BLK4 may be metadata MDATA that is migration-finished (MF) or metadata MDATA that is not migration-finished (NF). User data UDATA written to a memory block BLK5 is data migrated from the second memory die 2nd DIE (not illustrated) to the first memory die 1st DIE through a garbage collection operation.

The metadata MDATA1 and the metadata MDATA4, as metadata MDATA that are migration-finished (MF), may correspond to invalid data. On the other hand, the metadata MDATA2 and the metadata MDATA3, as metadata MDATA which are not migration-finished (NF), may correspond to valid data.

The memory controller 120 may write host user data HUDATA to the memory block BLK1 or the memory block BLK4, to which only invalid metadata MDATA is written in the first memory die 1st DIE.

The memory controller 120 may write host user data HUDATA to a memory block to which metadata MDATA is written earliest from among memory blocks included in the first memory die 1st DIE.

If the memory controller 120 has written the metadata MDATA1, MDATA2, MDATA3 and MDATA4 to the first memory die 1st DIE in that order, then the metadata MDATA1 that is written earliest may already be invalid metadata MDATA. The memory controller 120 may write the host user data HUDATA to the memory block BLK1 to which the invalid metadata MDATA1 is written. After the host user data HUDATA is written to the memory block BLK1, the memory controller 120 may write host user data HUDATA to the memory block BLK4, to which only invalid data is written as the metadata MDATA4 migration is complete.

The memory controller 120 may migrate the metadata MDATA2 and MDATA3, written to the memory blocks BLK2 and BLK3, to the second memory die 2nd DIE so that the memory blocks BLK2 and BLK3 are in a migration-finished (MF) state. After migrating the metadata MDATA2 written to the memory block BLK2 and the metadata MDATA3 written to the memory block BLK3, the memory controller 120 may write host user data HUDATA to the memory blocks BLK2 and BLK3.

User data UDATA migrated from the second memory die 2nd DIE to the memory block BLK5 through the garbage collection operation, and the host user data HUDATA written according to a request received from the outside, may be written to different memory blocks.

By writing host user data HUDATA to a memory block to which only invalid data is written, the memory controller 120 may prevent valid metadata MDATA and valid user data UDATA from coexisting in the same memory block.

Figure 14:
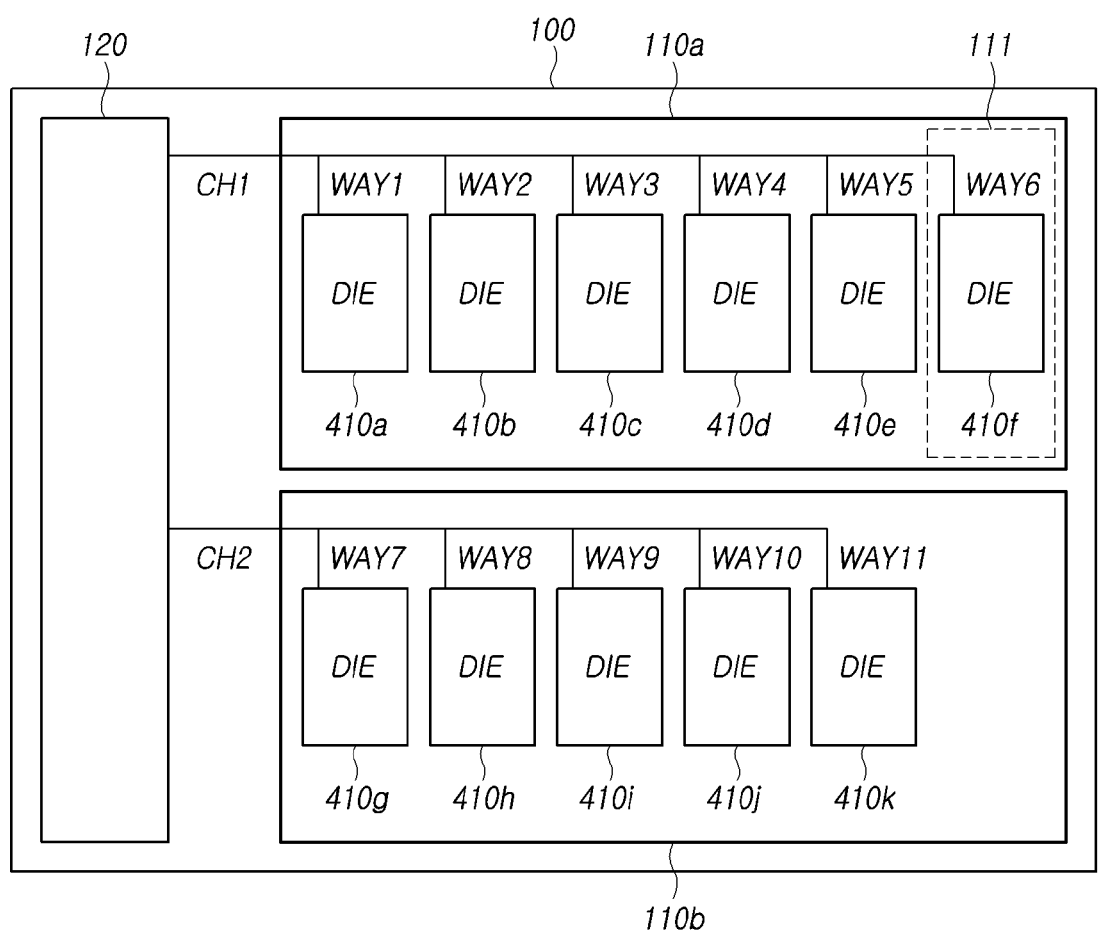
FIG. 14 is a diagram illustrating memory dies coupled to a first channel and a second channel according to an embodiment of the disclosure.

FIG. 14 is a diagram illustrating memory dies coupled to a first channel and a second channel according to an embodiment of the disclosure.

Referring to FIG. 14, a first memory device 110a may further include at least one additional memory die 111 compared to the second memory device 110b.

The memory controller 120 may set one of the memory dies 410a, 410b, 410c, 410d, 410e or 410f included in the first memory device 110a, as the metadata memory die MMD to which only metadata MDATA is written. The memory dies 410g, 410h, 410i, 410j and 410k of the second memory device 110b are set as the user data memory dies UMD to which only user data UDATA are written.

If a metadata memory die MMD is set among the memory dies 410g, 410h, 410i, 410j and 410k included in the second memory device 110b, an imbalance may occur between the user data memory dies UMD of the first memory device 110a and the second memory device 110b, and write/read access performance of the user data UDATA in the memory system 100 may decrease. By determining the metadata memory die MMD in the first memory device 110a, which includes the additional memory die 111, a balance between the numbers of the user data memory dies UMD of the first memory device 110a and the second memory device 110b may be maintained, and write/read access performance of the user data UDATA may be increased.

Figure 15:
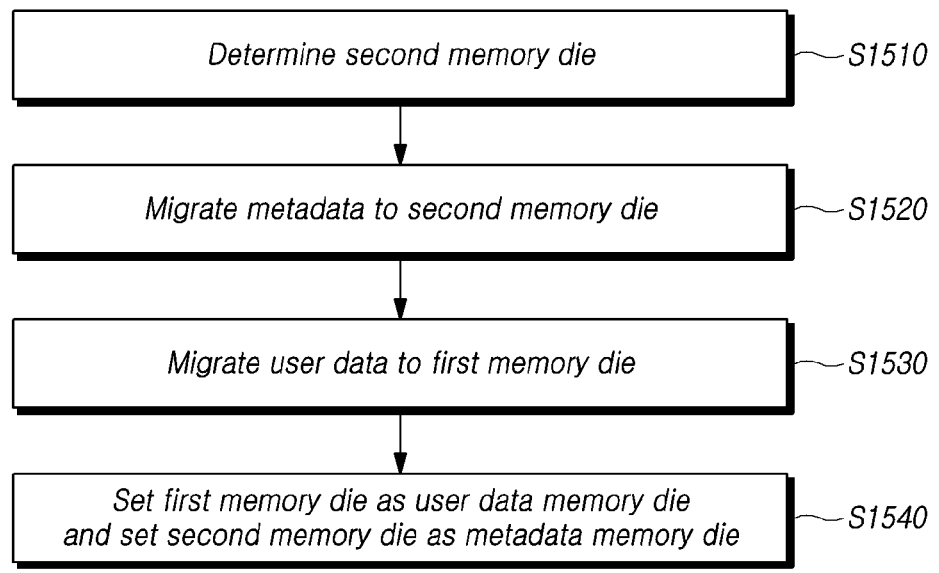
FIG. 15 is a diagram illustrating a method for operating a memory system according to an embodiment of the disclosure.

FIG. 15 is a diagram illustrating a method for operating a memory system according to an embodiment of the disclosure.

Referring to FIG. 15, a method for operating a memory system 100 may include determining, as a second memory die, a memory die whose bad block count is greater than that of a first memory die. The second memory die is then set as a metadata memory die in which metadata is stored, due to occurrence of a run-time bad block, among a plurality of memory dies set as user data memory dies in which user data are stored (S1510). The method includes migrating metadata written to the first memory die to the second memory die (S1520), migrating user data written to the second memory die to the first memory die (S1530), and setting the first memory die as a user data memory die and setting the second memory die as a metadata memory die (S1540).

In the method for operating the memory system 100, when migrating the user data written to the second memory die to the first memory die (S1530), a garbage collection operation may be performed on the second memory die by setting one of a plurality of memory blocks included in the first memory die as a destination memory block to which valid data is to be written.

In the method for operating the memory system 100, when determining the second memory die (S1510), a memory die whose bad block count is greater than that of the first memory die may be determined as the second memory die.

In the method for operating the memory system 100, when migrating the metadata written to the first memory die to the second memory die (S1520), metadata that is most recently written may be preferentially migrated.

The method for operating the memory system 100 may further include receiving a request to write host user data after migration of the metadata written to the first memory die is started, and writing the host user data to the first memory die according to the corresponding request.

In the method for operating the memory system 100, the host user data may be written to a memory block from which migration of metadata is finished, from among the memory blocks included in the first memory die.

In the method for operating the memory system 100, user data may be written preferentially to a memory block to which metadata is written earliest, from among memory blocks from which migration of metadata is entirely finished.

In the method for operating the memory system 100, a garbage collection operation may not be performed on a metadata memory die.

Figure 16:
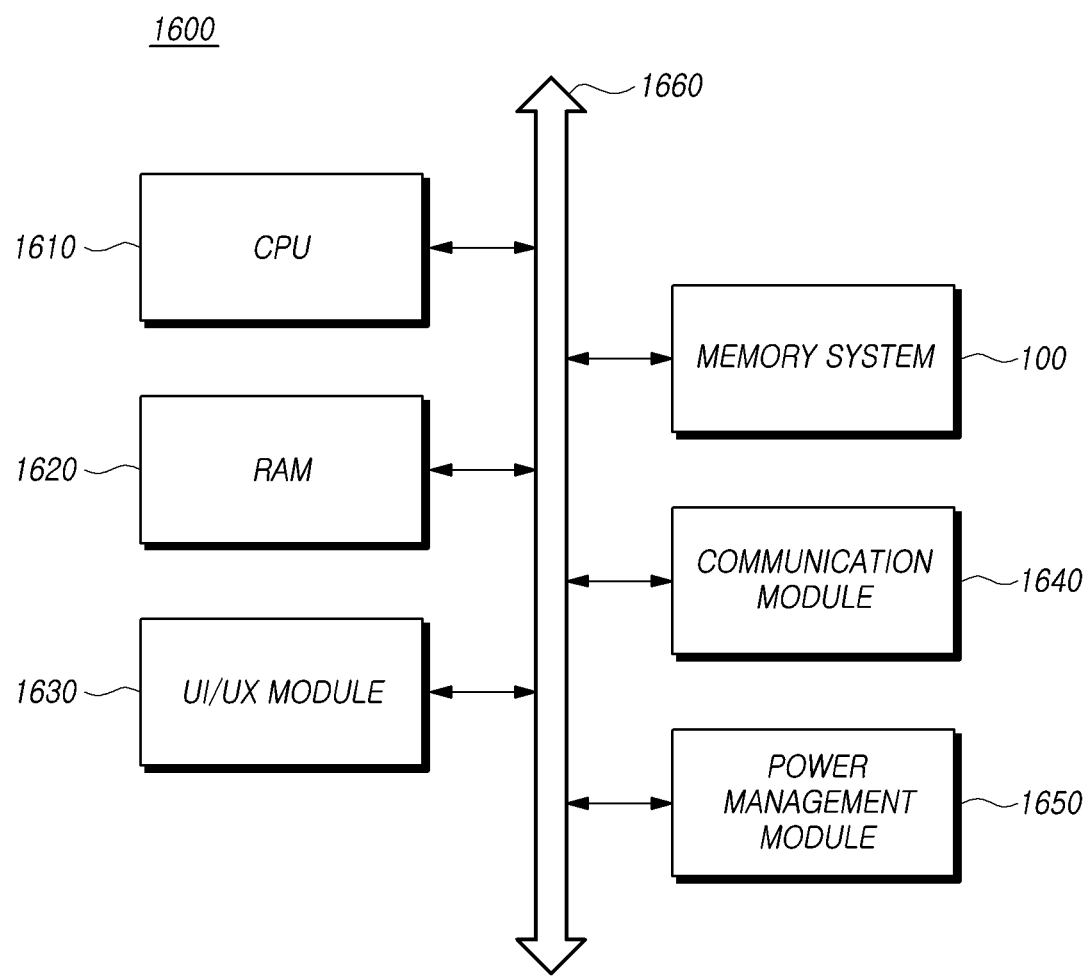
FIG. 16 is a diagram schematically illustrating a computing system including a memory system according to embodiments of the disclosure.

FIG. 16 is a diagram schematically illustrating a computing system with a memory system according to embodiments of the disclosure.

Referring to FIG. 16, a computing system 1600 in accordance with an embodiment of the disclosure may include a memory system 100, a central processing unit (CPU) 1610 for controlling general operations of the computing system

1600, a RAM 1620 for storing data and information related with operations of the computing system 1600, a UI/UX (user interface/user experience) module 1630 for providing use environment to a user, a communication module 1640 for communicating with an external device in a wired and/or wireless manner and a power management module 1650 for managing power used by the computing system 1600. The components are electrically coupled to a system bus 1660.

The computing system 1600 may include a PC (personal computer), a smartphone, a mobile terminal such as a tablet, or other various electronic devices.

The computing system 1600 may further include a battery for supplying an operating voltage, and may further include an application chipset, a graphic-related module, a camera image processor, a DRAM and so forth. It will be obvious to those skilled in the art to which the disclosed technology pertains that the computing system 1600 may include other components.

The memory system 100 may include not only a device that stores data in a magnetic disk, such as a hard disk drive (HDD), but also a device that stores data in a nonvolatile memory, such as a solid state drive (SDD), a universal flash storage (UFS) device and an embedded MMC (eMMC) device. The nonvolatile memory may include a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), and an FRAM (ferroelectric RAM). In addition, the memory system 100 may be realized into various types of storage devices, and may be mounted in various electronic devices.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A memory system comprising:
   a first memory device coupled to a first channel, and including a first memory die set as a metadata memory die including a plurality of memory blocks to which metadata is to be written, and including one or more memory dies set as user data memory dies including a plurality of memory blocks to which user data is to be written; and
   a memory controller configured to select a memory die whose run-time bad block count is greater than that of the first memory die from among the user data memory dies, as a second memory die; to migrate metadata written in the first memory die to the second memory die; to migrate user data written in the second memory die to the first memory die; to set the first memory die as a user data memory die; and to set the second memory die as a metadata memory die.

2. The memory system according to claim 1, wherein the memory controller is configured to:
   perform a garbage collection operation on the second memory die after selecting the second memory die among the user data memory dies, and set one from among a plurality of memory blocks included in the first memory die, as a destination memory block to which valid data is to be written, when performing the garbage collection operation on the second memory die.

3. The memory system according to claim 1, wherein, when setting the metadata memory die for a first time, the memory controller selects a memory die whose initial bad block count is highest from among a plurality of memory dies.

4. The memory system according to claim 1, wherein, when migrating the metadata written in the first memory die to the second memory die, the memory controller preferentially migrates metadata that is most recently written.

5. The memory system according to claim 1, wherein the memory controller receives, after migration of the metadata written to the first memory die is started, a request to write host user data from an outside, and writes the host user data to the first memory die.

6. The memory system according to claim 5, wherein the host user data is written to a memory block from which migration of metadata is completed from among the memory blocks included in the first memory die.

7. The memory system according to claim 6, wherein the memory controller writes the host user data preferentially to a memory block to which metadata is written earliest from among memory blocks for which migration of all metadata is finished.

8. The memory system according to claim 1, further comprising:
   a second memory device, including a plurality of memory dies, that is coupled to the memory controller through a second channel,
   wherein the first memory device further includes at least one additional memory die compared to the second memory device.

9. A method for operating a memory system, comprising:
   selecting a memory die, from among a plurality of memory dies set as user data memory dies in which user data is stored, as a second memory die, whose bad block count is greater than that of a first memory die set as a metadata memory die in which metadata is stored;
   migrating metadata written to the first memory die to the second memory die;
   migrating user data written to the second memory die to the first memory die; and
   setting the first memory die as a user data memory die, and setting the second memory die as a metadata memory die.

10. The method according to claim 9, wherein, when migrating the user data written to the second memory die to the first memory die, a garbage collection operation is performed on the second memory die by setting one of a plurality of memory blocks included in the first memory die as a destination memory block to which valid data is to be written.

11. The method according to claim 9, wherein, when migrating the metadata written to the first memory die to the second memory die, metadata that is most recently written is preferentially migrated.

12. The method according to claim 9, further comprising:
   receiving, after migration of the metadata written to the first memory die is started, a request to write host user data; and
   writing the host user data to the first memory die according to the request.

13. The method according to claim 12, wherein the host user data is written to a memory block from which migration of metadata is complete among the memory blocks included in the first memory die.

14. The method according to claim 13, wherein the host user data is written preferentially to a memory block to which metadata is written earliest, from among memory blocks from which migration of all metadata is complete.

15. A memory system comprising:
- a first memory device coupled to a first channel, and including a plurality of memory dies;
- a second memory device coupled to a second channel, and including a plurality of memory dies having a number different from a number of memory dies included in the plurality of memory dies of the first memory device; and
- a memory controller configured to write metadata to a memory die whose bad block count is greatest and whose number of memory dies is greater between the first memory device and the second memory device, and to write user data to remaining memory dies included in the first memory device and the second memory device.

* * * * *